United States Patent
Lloyd et al.

(10) Patent No.: US 7,818,805 B2
(45) Date of Patent: Oct. 19, 2010

(54) METHODS AND SYSTEMS FOR NETWORK TRAFFIC SECURITY

(75) Inventors: Michael A. Lloyd, Belmont, CA (US); Mansour J. Karam, San Francisco, CA (US); Pierre Fraval, New York, NY (US); Sean P. Finn, Belmont, CA (US); James G. McGuire, San Francisco, CA (US); Omar C. Baldonado, Palo Alto, CA (US)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 12/284,933

(22) Filed: Sep. 25, 2008

(65) Prior Publication Data

US 2009/0031420 A1   Jan. 29, 2009

Related U.S. Application Data

(62) Division of application No. 11/223,236, filed on Sep. 9, 2005, now Pat. No. 7,596,811.

(60) Provisional application No. 60/609,062, filed on Sep. 9, 2004.

(51) Int. Cl.
G06F 21/00 (2006.01)
H04L 29/06 (2006.01)
(52) U.S. Cl. ........................ 726/23; 713/153
(58) Field of Classification Search ............ 726/2–7, 726/11–14, 21–25; 713/153, 154; 709/223–225, 709/238–240

See application file for complete search history.

(56) References Cited

U.S. PATENT DOCUMENTS 4,901,244 A   2/1990   Szeto (Continued)

FOREIGN PATENT DOCUMENTS

WO   WO 00/38381   6/2000

(Continued)

OTHER PUBLICATIONS

U.S. Appl. No. 60/591,872, filed Jul. 29, 2004, Phillip Zakas et al.

(Continued)

*Primary Examiner*—Gilberto Barron, Jr.
*Assistant Examiner*—Abdulhakim Nobahar
(74) *Attorney, Agent, or Firm*—Sheridan Ross P.C.

(57) ABSTRACT

The present invention is directed to methods of and systems for adaptive networking that monitors a network resource of a network. The method monitors an application performance. The method categorizes a first subset of traffic of the network. The categories for the first subset include trusted, known to be bad, and suspect. The method determines an action for a second subset of traffic based on the category for the first subset of traffic. Some embodiments provide a system for adaptive networking that includes a first device and traffic that has a first subset and a second subset. The system also includes a first resource and a second resource for the transmission of the traffic. The first device receives the traffic and categorizes the traffic into the first and second subsets. The first device assigns the first subset to the first resource. Some embodiments provide a network device that includes an input for receiving incoming traffic, an output for sending outgoing traffic, a categorization module that categorizes incoming traffic, and a resource assignment module that assigns the categorized traffic for a particular resource. A traffic category for the device includes suspect traffic.

10 Claims, 10 Drawing Sheets

U.S. PATENT DOCUMENTS

| | | | |
|---|---|---|---|
| 5,343,463 | A | 8/1994 | van Tetering et al. |
| 5,537,394 | A | 7/1996 | Abe et al. |
| 5,590,126 | A | 12/1996 | Mishra et al. |
| 5,652,841 | A | 7/1997 | Nemirovsky et al. |
| 5,654,958 | A | 8/1997 | Natarajan |
| 5,729,528 | A | 3/1998 | Salingre et al. |
| 5,812,528 | A | 9/1998 | VanDervort |
| 5,835,726 | A | 11/1998 | Shwed et al. |
| 5,841,775 | A | 11/1998 | Huang |
| 5,884,047 | A | 3/1999 | Aikawa et al. |
| 5,892,754 | A | 4/1999 | Kompella et al. |
| 5,940,478 | A | 8/1999 | Vaudreuil et al. |
| 5,974,457 | A | 10/1999 | Waclawsky et al. |
| 6,012,088 | A | 1/2000 | Li et al. |
| 6,052,718 | A | 4/2000 | Gifford |
| 6,064,946 | A | 5/2000 | Beerends |
| 6,078,963 | A | 6/2000 | Civanlar et al. |
| 6,178,448 | B1 | 1/2001 | Gray et al. |
| 6,185,601 | B1 | 2/2001 | Wolff |
| 6,189,044 | B1 | 2/2001 | Thomson et al. |
| 6,292,832 | B1 | 9/2001 | Shah et al. |
| 6,311,144 | B1 | 10/2001 | Abu El Ata |
| 6,363,332 | B1 | 3/2002 | Rangarajan et al. |
| 6,385,198 | B1 | 5/2002 | Ofek et al. |
| 6,385,643 | B1 | 5/2002 | Jacobs et al. |
| 6,426,955 | B1 | 7/2002 | Gossett Dalton, Jr. et al. |
| 6,434,606 | B1 | 8/2002 | Borella et al. |
| 6,438,592 | B1 | 8/2002 | Killian |
| 6,446,028 | B1 | 9/2002 | Wang |
| 6,452,950 | B1 | 9/2002 | Ohlsson et al. |
| 6,453,356 | B1 | 9/2002 | Sheard et al. |
| 6,463,454 | B1 | 10/2002 | Lumelsky et al. |
| 6,493,353 | B2 | 12/2002 | Kelly et al. |
| 6,522,627 | B1 | 2/2003 | Mauger |
| 6,538,416 | B1 | 3/2003 | Hahne et al. |
| 6,556,582 | B1 | 4/2003 | Redi |
| 6,560,204 | B1 | 5/2003 | Rayes |
| 6,594,307 | B1 | 7/2003 | Beerends |
| 6,601,101 | B1 | 7/2003 | Lee et al. |
| 6,614,789 | B1 | 9/2003 | Yazdani et al. |
| 6,687,229 | B1 | 2/2004 | Kataria et al. |
| 6,701,432 | B1 | 3/2004 | Deng et al. |
| 6,704,768 | B1 | 3/2004 | Zombek et al. |
| 6,707,824 | B1 | 3/2004 | Achilles et al. |
| 6,711,152 | B1 | 3/2004 | Kalmanek, Jr. et al. |
| 6,714,896 | B1 | 3/2004 | Barrett |
| 6,728,484 | B1 | 4/2004 | Ghani |
| 6,728,779 | B1 | 4/2004 | Griffin et al. |
| 6,735,177 | B1 | 5/2004 | Suzuki |
| 6,751,562 | B1 | 6/2004 | Blackett et al. |
| 6,757,255 | B1 | 6/2004 | Aoki et al. |
| 6,760,775 | B1 | 7/2004 | Anerousis et al. |
| 6,760,777 | B1 | 7/2004 | Agarwal et al. |
| 6,795,860 | B1 | 9/2004 | Shah |
| 6,801,502 | B1 | 10/2004 | Rexford et al. |
| 6,810,417 | B2 | 10/2004 | Lee |
| 6,820,133 | B1 | 11/2004 | Grove et al. |
| 6,826,613 | B1 | 11/2004 | Wang et al. |
| 6,836,463 | B2 | 12/2004 | Garcia-Luna-Aceves et al. |
| 6,839,745 | B1 | 1/2005 | Dingari et al. |
| 6,839,751 | B1 | 1/2005 | Dietz et al. |
| 6,894,991 | B2 | 5/2005 | Ayyagari et al. |
| 6,912,222 | B1 | 6/2005 | Wheeler et al. |
| 6,956,858 | B2 | 10/2005 | Hariguchi et al. |
| 6,963,575 | B1 | 11/2005 | Sistanizadeh et al. |
| 6,963,914 | B1 | 11/2005 | Breitbart et al. |
| 6,973,490 | B1 | 12/2005 | Robertson et al. |
| 6,981,055 | B1 | 12/2005 | Ahuja et al. |
| 6,999,432 | B2 | 2/2006 | Zhang et al. |
| 7,020,086 | B2 | 3/2006 | Juttner et al. |
| 7,024,475 | B1 | 4/2006 | Abaye et al. |
| 7,085,230 | B2 | 8/2006 | Hardy |
| 7,099,282 | B1 | 8/2006 | Hardy |
| 7,110,393 | B1 | 9/2006 | Tripathi et al. |
| 7,111,073 | B1 | 9/2006 | Jain et al. |
| 7,123,620 | B1 | 10/2006 | Ma |
| 7,139,242 | B2 | 11/2006 | Bays |
| 7,155,436 | B2 | 12/2006 | Hegde et al. |
| 7,162,539 | B2 | 1/2007 | Garcie-Luna-Aceves |
| 7,269,157 | B2 | 9/2007 | Klinker et al. |
| 7,324,447 | B1* | 1/2008 | Morford ................ 370/231 |
| 7,543,052 | B1* | 6/2009 | Cesa Klein ............ 709/224 |
| 7,596,811 | B2 | 9/2009 | Lloyd et al. |
| 7,743,415 | B2 | 6/2010 | Poletto et al. |
| 2001/0010059 | A1 | 7/2001 | Burman et al. |
| 2001/0026537 | A1 | 10/2001 | Massey |
| 2002/0075813 | A1 | 6/2002 | Baldonado et al. |
| 2002/0078223 | A1 | 6/2002 | Baldonado et al. |
| 2002/0093527 | A1 | 7/2002 | Sherlock |
| 2002/0099854 | A1* | 7/2002 | Jorgensen ............... 709/249 |
| 2002/0101821 | A1 | 8/2002 | Feldmann et al. |
| 2002/0184527 | A1 | 12/2002 | Chun et al. |
| 2003/0039212 | A1 | 2/2003 | Lloyd et al. |
| 2003/0112788 | A1 | 6/2003 | Erhart et al. |
| 2003/0161321 | A1 | 8/2003 | Karam et al. |
| 2003/0204619 | A1* | 10/2003 | Bays ........................ 709/238 |
| 2004/0015719 | A1 | 1/2004 | Lee et al. |
| 2004/0030776 | A1 | 2/2004 | Cantrell et al. |
| 2004/0062267 | A1 | 4/2004 | Minami et al. |
| 2004/0162994 | A1* | 8/2004 | Cohen et al. ............... 726/4 |
| 2004/0218546 | A1 | 11/2004 | Clark |
| 2005/0044270 | A1 | 2/2005 | Groove et al. |
| 2005/0083912 | A1 | 4/2005 | Asfar et al. |
| 2005/0132060 | A1 | 6/2005 | Mo et al. |
| 2005/0201302 | A1 | 9/2005 | Gaddis et al. |
| 2005/0243726 | A1 | 11/2005 | Narendran |
| 2006/0026682 | A1 | 2/2006 | Zakas et al. |
| 2006/0036763 | A1 | 2/2006 | Johnson et al. |
| 2006/0056328 | A1* | 3/2006 | Lehane et al. ............ 370/315 |
| 2007/0271066 | A1 | 11/2007 | Nikitin et al. |
| 2008/0101793 | A1 | 5/2008 | Koch et al. |

FOREIGN PATENT DOCUMENTS

| | | |
|---|---|---|
| WO | WO 02/33893 | 4/2002 |
| WO | WO 03/067731 | 8/2003 |

OTHER PUBLICATIONS

U.S. Appl. No. 60/591,874, filed Jul. 29, 2004, Phillip Zakas et al.

"A Longest Prefix Match Search Engine for Multi-Gigabit IP Processing", Masayoshi Kobayashi et al., C&C Media Research Laboratories, NEC Corporation, pp. 1360-1364, 2000 IEEE.

"Internet Protocol" from Nortel Networks, www.arvelo.net/net-bay-ip.html. Apr. 6, 2005, 26 pages.

"BGP-4 Protocol Analysis", http://www.rfc-editor.org/rfc/rfc1774.txt, Mar. 1995, Cisco Systems, pp. 1-10.

Routing Policy Specification Language (RPSL), (Internet—Draft), http://quimby.gnus.org/internet-drafts/draft-ietf-rps-rpsl-v2-03.txt., pp. 1-68, Apr. 6, 1999.

Nick Feamster et al., "Controlling the Impact of BGP Policy Changes on IP Traffic", Nov. 6, 2001, pp. 1-18.

Dean Jones, "Developing Shared Ontologies in Multi-Agent Systems", pp. 1-10.

L. Massoulié et al., "Arguments in favour of admission control for TCP flows", pp. 1-16.

Murthy, Shree, et al, "A loop-free routing protocol for large-scale internets using distance vectors,"Mar. 14, 2007, pp. 147-161, Computer Communications.

Francis, Paul, et al, "An Architecture for a Global Internet Host Distance Estimation Service," 1999, pp. 210-217, IEEE.

Bouloutas, A. et al, "Some Graph Partitioning Problems and Algorithms Related to Routing in Large Computer Networks," International Conference on Distributed Computing Systems, Newport Beach, Jun. 5-9, 1989, pp. 362-370, Washington, IEEE Comp. Soc. Press, US.

Yositsugu, Ohmae et al, "Dividing Method for Topological Design of Corporate Communication Networks," Aug. 1, 1992, pp. 54-62, Communications, Wiley Hoboken ,NJ, US.

D. New, "RFC 3620, The TUNNEL Profile," Oct. 2003, The Internet Society.

International Search Report for International (PCT) Application No. PCT/US2005/032463, mailed Oct. 23, 2007.

Written Opinion for International (PCT) Application No. PCT/US2005/032463, mailed Oct. 23, 2007.

International Preliminary Report on Patentability for International (PCT) Application No. PCT/US2005/032463, mailed Nov. 22, 2007.

Official Action U.S. Appl. No. 11/233,236, mailed Sep. 26, 2007.

Official Action U.S. Appl. No. 11/233,236, mailed Apr. 8, 2008.

Official Action U.S. Appl. No. 11/233,236, mailed Jun. 18, 2008.

Official Action U.S. Appl. No. 11/233,236, mailed Oct. 29, 2008.

Notice of Allowance for U.S. Appl. No. 11/233,236, mailed May 28, 2009.

Fuji et al., "Active Countermeasure Platform Against DDoS Attacks," IEICE Transactions on Information and Systems, Information and Systems Society, vol. E85-D, No. 12, Dec. 1, 2002, pp. 1918-1928.

Thomsen et al., "Napolean Network Application Policy Environment," Proceedings on 4th ACM Workshop on Role-Based Access Control, Fairfax, VA, Oc. 28-29, 1999, pp. 145-152.

Extended European Search Report for European Patent Application No. 05812464.5, dated Jun. 7, 2010.

* cited by examiner

METHODS AND SYSTEMS FOR NETWORK TRAFFIC SECURITY

RELATED APPLICATIONS

This application is a divisional of U.S. patent application Ser. No. 11/223,236, filed Sep. 9, 2005, now U.S. Pat. No. 7,596,811 and titled "METHODS AND SYSTEMS FOR NETWORK TRAFFIC SECURITY," which claims priority from U.S. Provisional Patent Application No. 60/609,062, filed Sep. 9, 2004, and entitled "METHODS AND SYSTEMS FOR REMOTE OUTBOUND CONTROL, SECURITY STRAWMAN," which are both hereby incorporated by reference in their entireties.

FIELD OF THE INVENTION

This invention is related to network traffic security. Specifically, this invention is related to providing network traffic security by using traffic categorization and/or resource allocation.

BACKGROUND OF THE INVENTION

In the current connected world of inter-operating networks, preventing unwanted access and unwanted intrusions are a constant issue. Some approaches to coping with network-based attacks involve detecting the occurrence of intrusions as a step to formulating a response. Typical intrusion-detection techniques have suffered from false positives and false negatives, both of which often have disastrous consequences. False negatives result in failure to protect a network from attacks, while false positives result in either lost business or in systems that "cry wolf." Thus, false positives also result in failure to protect the network because this type of error also ultimately reduces the effectiveness of the solutions that are intended to protect the network from real attacks.

The problem of false positives and negatives results from two characteristics of typical intrusion detection systems. Even though there exist many products and approaches that attempt to protect data centers, servers and network resources from intrusion or attack, such as, for example, Denial of Service (DoS) attacks, the typical approaches all share the following characteristics:

(1) The approach bases intrusion detection solely on some kind of an examination of the network traffic. That is, whether the approach is online or offline, the approach determines whether an attack is present by looking at each packet and examining its characteristics and contents. Thus, more specifically, extrinsic knowledge that is gained from interacting with other tools and protocols in the network is seldom used to help in the detection. Moreover, the determination of whether traffic is trusted or is known to be bad when based solely on an examination of the current traffic itself is often not effective, or is too late to be useful.

(2) The intrusion detection's outcome is either "black" or "white." That is, traffic is either categorized as trusted or known to be bad. There is typically no additional categorization of traffic that is neither trusted nor known to be bad. There is no concept of a gray area in a conventional system. Thus, there is no category of traffic that is intermediate, unknown, or suspect but not yet determined as known to be bad. Typically, depending on the particular implementation and user configuration, such suspect traffic is either categorized as trusted or as known to be bad.

As mentioned above, one problem with having only the two categories of "trusted" and "known to be bad" is that the user ends up with a significant amount of false positives, false negatives, or both. Both false negatives and false positives can cost a great deal of time and money. Both false positives and false negatives can cause disastrous consequences. For instance, when false negatives occur, the detection measure fails to protect against an unwanted intrusion and the organization's resources are exposed to the intruder. False positives can also be costly. Depending on the implementation, traffic categorized as known to be bad either triggers alarms, or is dropped. Dropping good traffic typically results in lost business and missed opportunities, and often has additional consequences. Alarm triggers result in information technology (IT) personnel spending time investigating the occurrence, which can cost a company in terms of employee resources, system down time and money. Having several false alarms erodes the confidence in the protective system such that when the system "cries wolf" enough times, the alarms are either ignored or the safeguards, responsive counter-measures, and notifications and/or protections, are tuned down too low to be effective. This reduces the ability of the protective system to detect and protect against the real attacks.

The U.S. Pat. No. 5,835,726, filed Jun. 17, 1996, and entitled "System for securing the flow of and selectively modifying packets in a computer network," and U.S. Pat. No. 6,701,432, filed Apr. 1, 1999, and entitled "Firewall including local bus," discuss the traditional systems mentioned above, including firewall type systems. The U.S. Pat. Nos. 5,835,726 and 6,701,432, are hereby incorporated by reference.

SUMMARY OF THE INVENTION

The present invention is a system for and method of protecting a network. The system prevents data traffic that can harm the network. Moreover, the system prevents false positive and false negative determinations relative to potential unwanted intrusions.

Traffic is categorized into at least three categories including trusted, known to be bad and suspect. The system can utilize different resources for different categories of traffic. This can prevent bad data or suspect data from damaging the network resources and also provide enhanced service to trusted traffic. The system tracks a history of network users and usage. The history is utilized in determining which category is designated for traffic. New end-points and/or traffic can initially be handled as suspect, and then later be upgraded to trusted or demoted to bad. The history can also be used to determine a so-called frequent flyer which can receive enhanced handling.

Traffic that is determined to be bad can be dropped or also black holed to the edge of the network. Traffic that is suspect can be directed through a different resource. The different resource can be a different physical resource or a different logical resource in the same physical resource but handled with a different priority. Detection of attacks can be source based, destination based, frequent flyer based or flow rate based.

An additional boundary can be used in conjunction with traditional intrusion detection to enhance security. By handling suspect and bad traffic with different network resources, the impact of any error introduced by traditional intrusion detection methods is minimized. The invention can be implemented in hardware, software or a combination thereof.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION OF THE INVENTION

In the following description, numerous details and alternatives are set forth for purpose of explanation. However, one of ordinary skill in the art will realize that the invention can be practiced without the use of these specific details. In other instances, well-known structures and devices are shown in block diagram form in order not to obscure the description of the invention with unnecessary detail. Section I below describes the process implementation of some embodiments of the present invention. Section II describes the critical boundary that results from the implementation of some embodiments. Section III describes several system implementations and Section IV discusses the particular advantages of the invention.

The invention is used to monitor network resources and measure the performance at an end user's system of operating an application over the internet or another network. By using the monitoring, a unique view of network activity that combines application knowledge, historical knowledge of the users in the network, the applications they use, traffic patterns, and the expected characteristics and requirements of the users and applications. The unique views are used to enhance the effectiveness of intrusion detection by reducing the number of false positives and false negatives. These advantages are provided by using a novel set of application programming interfaces (APIs), network management tools, and applications, while certain alternatives introduce a number of novel concepts to existing intrusion detection tools.

I. PROCESS IMPLEMENTATION

A. Categorizing Traffic

Figure 1A:
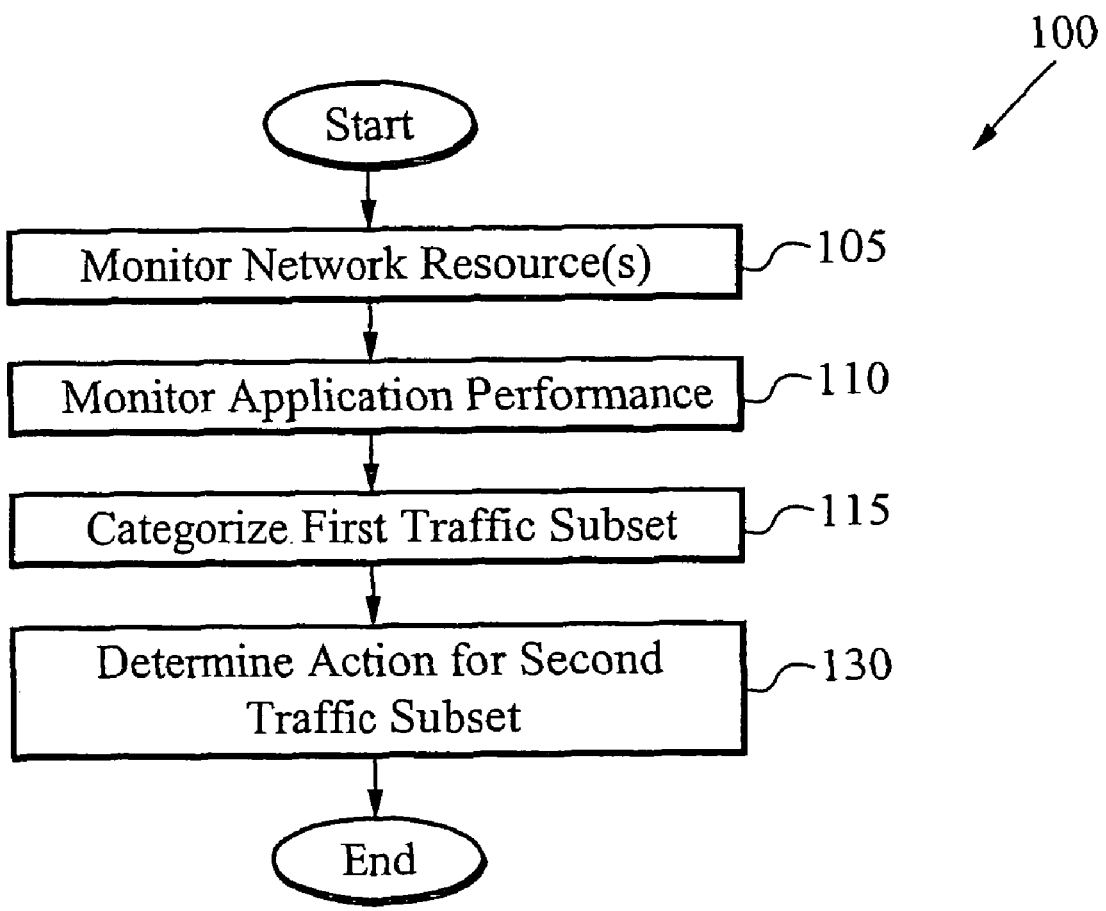
FIG. 1A illustrates a process for categorizing traffic according to the invention.

FIG. 1A illustrates a process 100 that is implemented by a particular embodiment of the present invention. As shown in FIG. 1A, a network resource is monitored, at step 105. Then, at step 110, an application performance is also monitored. For instance, the monitoring of network resources and application performance can include measuring at an end user's system the performance of operating an application over a network. The network can include the Internet as well as other types of networks such as, for example, local area networks, intranets, private networks, and virtual private networks. Traffic typically flows from one endpoint in the network, for example, a source, to another endpoint in the network, for example, a destination. Traffic refers to data flowing over the network.

Figure 2:
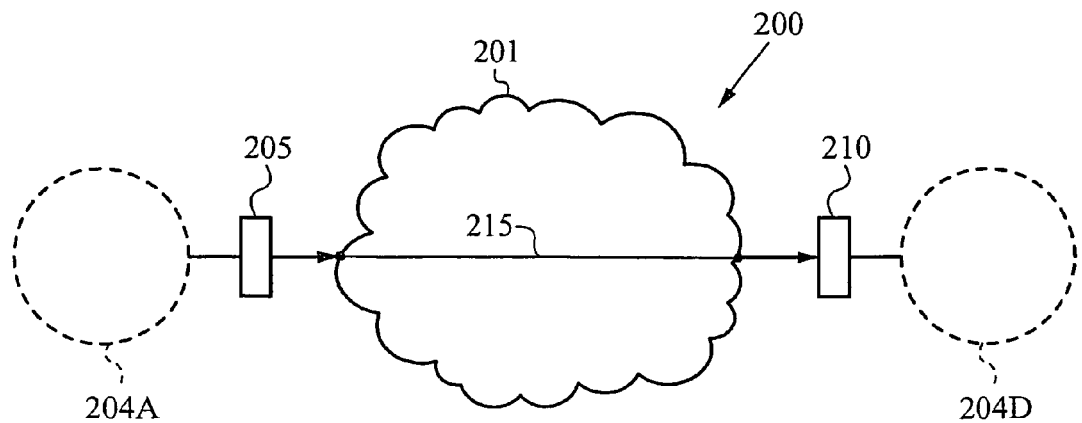
FIG. 2 illustrates a first device sending traffic to a second device through a network.

As an example, FIG. 2 illustrates a first device 205 providing traffic to a second device 210 through an exemplary network 200. The network 200 is a network of networks, such as, for example, the Internet 201. The first device 205 acts as a source to the second device 210 that acts as a destination. The first and second devices 205 and 210 are each coupled to a subnetwork 204A and 204D, respectively. In this embodiment, the first and second devices 205 and 210 provide an interface between the Internet 201 and the subnetwork(s) 204A and 204D. As shown in FIG. 2, the traffic arrives at the second device 210 through a network resource 215. One of ordinary skill will recognize that the network 200 illustrated in FIG. 2 is exemplary. Thus, the network 200 is representative of other types and configurations of networks such as, for example, an MPLS network, an MPLS-VPN network, a private network, a VPN network, and/or an ATM network."

As mentioned above, traffic is monitored as it flows from a source to a destination through the network. Again referring to FIG. 1A, while traffic flows through the network, a first subset of the traffic is categorized into a first category at step 115 in the process 100. The types of traffic for the first category include trusted, known to be bad, suspect traffic, and/or a combination thereof. It will be appreciated by those of ordinary skill in the art that additional levels of categories can be implemented according to the present invention. Next, at step 130, an action for a second subset of traffic is determined based on the category of the first subset of traffic. The process 100 then concludes. The first subset of traffic is categorized based on the monitoring of the network resources and/or based on the monitoring of the performance of the application. Similarly, the action for the second subset is based on the network resources and/or based on the performance of the application.

Figure 1B:
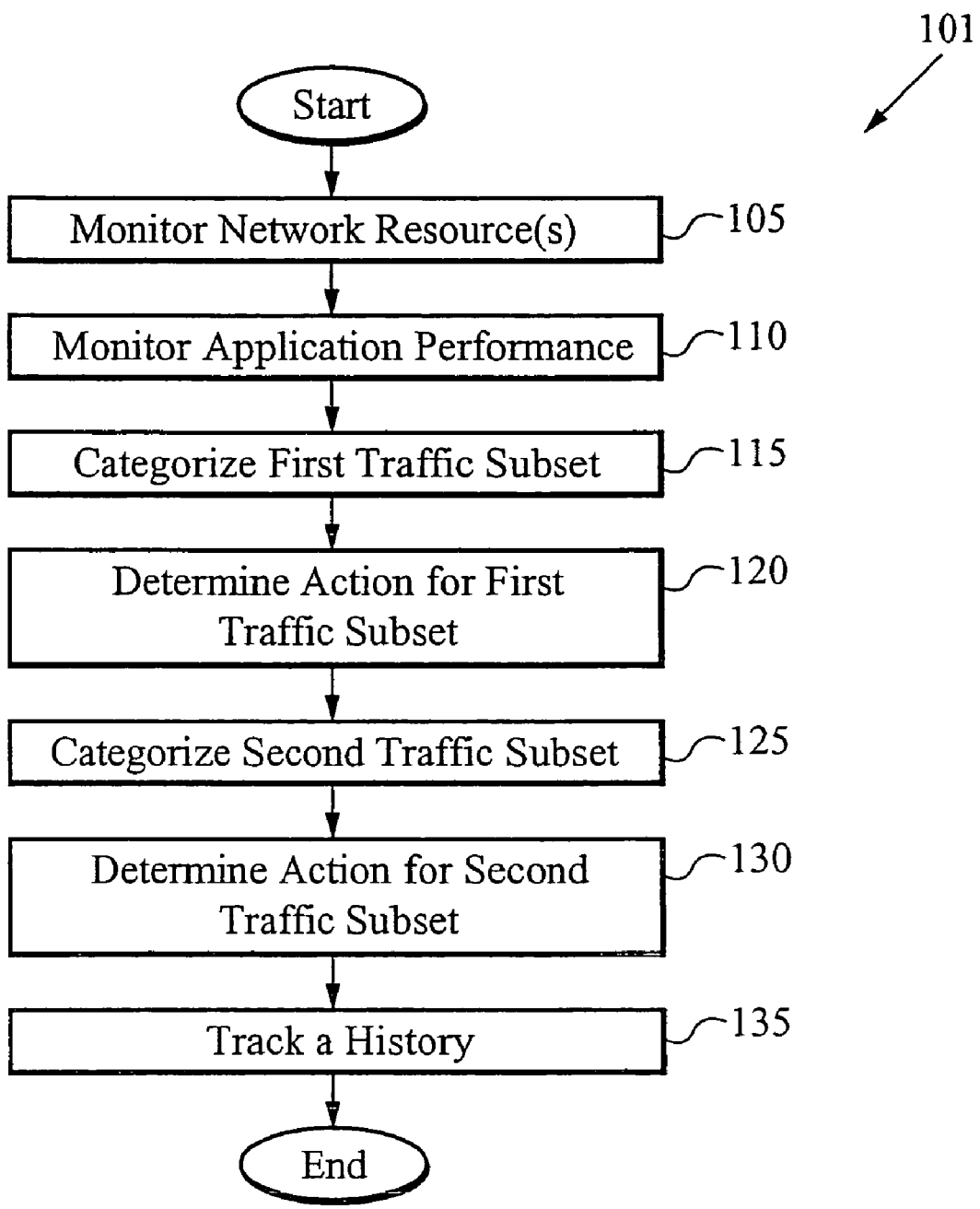
FIG. 1B illustrates the process of FIG. 1A with additional steps.

One of ordinary skill in the art will further recognize variations of the particular process implementation illustrated in FIG. 1A. For instance, the processes of alternative implementations include additional steps and/or different orderings of the steps. Specifically, the system of a particular implementation preferably tracks a history that includes information based on users and their patterns of network usage while monitoring the resources and/or applications for the network. The system can also determine an action for the first subset and/or categorize a second subset of traffic. FIG. 1B illustrates an additional exemplary implementation of a process 101 that includes these additional steps. Reference numerals used on elements of the several figures will be the same for the same elements of the illustrated embodiments. For instance, similarly labeled steps in the process 101 of FIG. 1B are the same as the steps described above for the process 100 of FIG. 1A. As shown in FIG. 1B, after the first traffic subset is categorized at step 115, the process 101 transitions to step 120, where an action is determined for the first subset of traffic. Then, the process 101 transitions to step 125, where a second subset of traffic is categorized. Next, at step 130, an action for the second subset of traffic is determined and the process 101 transitions to step 135. At step 135, a history is tracked of users and their patterns of network usage. The process 101 then concludes. As mentioned above, one of ordinary skill will recognize the possible variations of the exemplary implementations illustrated in FIGS. 1A and 1B. For instance, in an equivalent process implementation of the process 101 illustrated in FIG. 1B, the second subset of traffic is categorized before the action is determined for the first subset of traffic.

Figure 3:
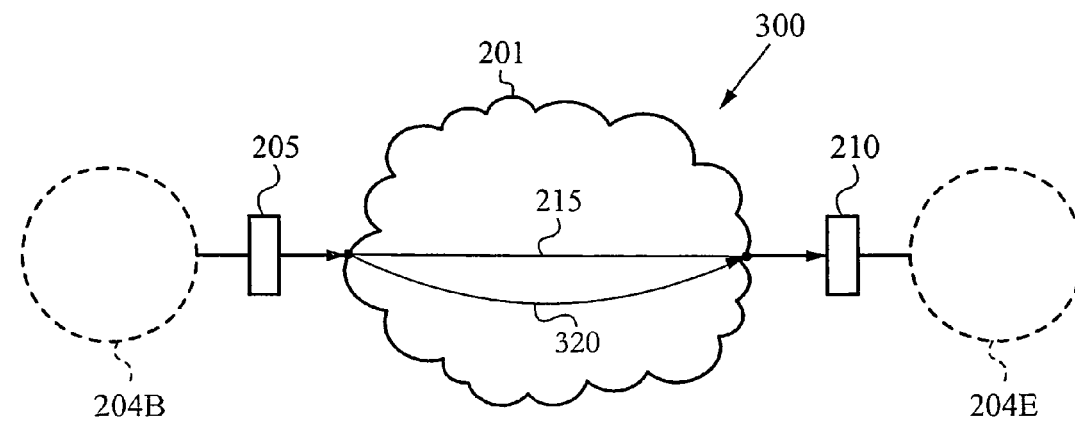
FIG. 3 illustrates a first device sending traffic to a second device by using more than one resource.
Figure 4:
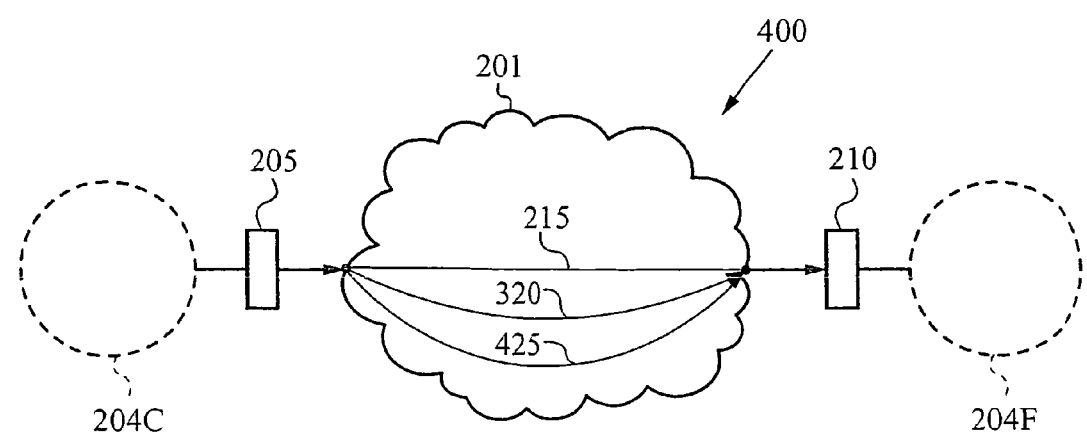
FIG. 4 illustrates a first device using a third resource.

Preferably, the first subset and second subset of traffic do not overlap. For instance, according to certain alternatives of the present invention, the first subset of traffic includes suspect traffic, while the second subset includes trusted traffic. Alternative embodiments treat the traffic differently. For instance, FIG. 3 illustrates a network in accordance with such an embodiment. FIG. 3 shows substantially the same network with substantially the same elements as FIG. 2, except there is an additional network resource 320. As shown in FIG. 3, traffic that is categorized as trusted is routed separately from the suspect traffic through the additional resource 320. Other alternative embodiments include a third category for traffic that is known to be bad. The bad traffic of some embodiments is further treated differently than the trusted and suspect traffic. FIG. 4 shows substantially the same network with substantially the same elements as FIG. 3, except there is an additional network resource 425. As shown in FIG. 4, traffic that is categorized as known to be bad is routed through the additional resource 425. In some embodiments, the traffic includes traffic that has already been determined as trusted. These embodiments will be described further in Section III.

1. Traffic Monitoring

Preferably, the invention observes traffic and monitors the users of the network. Alternative embodiments further monitor one or more network resources. For example, some embodiments monitor bandwidth utilization. These embodiments assess performance of the operation of an application over the network, and inject the changes to the network as needed to ensure adequate application performance at a destination. Other embodiments also enforce a business policy, for example, by ensuring that important transactions get the best service. In these embodiments, the general population of users on the network continue to receive adequate service, which minimizes the cost and use of the shared network resources.

The shared network resources include the different routing mechanisms for traffic, such as, for example, channels, protocols, and/or services. This can constrain the flow of traffic and/or inject changes by restricting resource allocation. Resource allocation can be performed by assigning the differently categorized traffic:

(1) to different paths, so that traffic is routed in one or another direction; or (2) with different tags, so that traffic is tagged for service by various service levels; or (3) with different markings, so that some types of traffic are prioritized over other traffic types.

However, one of ordinary skill will recognize various additional resource allocations which can be used. Resource allocation is discussed further below.

2. Categories of Traffic

Traffic can be categorized by detecting traffic that has unusual characteristics. When traffic is detected with unusual characteristics, the unusual traffic can be assigned a non-zero probability of being part of an attack, representing a confidence in the traffic. When the confidence is less than a predetermined threshold the system can presume that such traffic constitutes an attack, the unusual traffic is categorized as suspect.

As mentioned above, the network resources and/or application performance are monitored to categorize a first subset of traffic. The monitoring and/or categorization can be used to determine an action to take for the first and/or a second subset of traffic. By measuring the network resources and performance, the system is aware of the application performance for a given subset of the traffic across the different resources. The measurements are used categorize the traffic as either trusted or suspect. These embodiments typically send trusted traffic to a first set of resources, while sending suspect traffic to a second set of resources, as mentioned above in relation to FIG. 3.

The separate first and second resources ensure that the suspect traffic is isolated from the trusted traffic. The separation minimizes the negative effects of the suspect traffic, particularly of the suspect traffic that proves problematic, for example, the suspect traffic that is later determined to be bad. Moreover, the data carried by the trusted traffic of some embodiments are given a higher priority, such as a lower latency, as compared to suspect data. In these embodiments, trusted traffic preempts suspect traffic, thereby minimizing the potentially damaging effects of the suspect traffic carrying data that later proves harmful.

3. New Endpoints and Demotion

A new endpoint and/or new traffic can be initially categorized as suspect. These new endpoints and/or new traffic can later be adjusted from the suspect category to trusted or bad based on a number of factors. Additionally, any endpoint that is generating more traffic than expected can be categorized as either suspect or bad. Further, unusual traffic and/or traffic from an endpoint that is behaving unusually can be demoted to the suspect and/or bad category. Traffic is determined to be unusual when it operates according to criteria programmed into the system such as excessive traffic such as from a DoS attack. The unusual traffic and/or endpoint can be demoted even if the traffic in question was previously considered trusted. These embodiments typically protect from attacks that originate from what appear to be trusted endpoints regardless of the nature of the attack. For instance, when trusted traffic consumes too many resources, even the trusted traffic is temporarily downgraded to protect against attacks staged from the trusted endpoints. Attacks from the trusted endpoints of some embodiments can be of several possible types including: (1) the source address of the trusted endpoint is spoofed; (2) the trusted endpoint is in fact responsible for the attack; and (3) the trusted endpoint has been compromised.

An endpoint and/or traffic that has previously been categorized as trusted can be assigned a special status, for example, as a "frequent flyer." Frequent flyer status is discussed in detail next.

4. Frequent Flyers

A "frequent flyer" concept can be added to help in the determination of a category for a particular subset of traffic and/or in the determination of an action for the subset. While monitoring the network and traffic, historical information can be tracked which is related to the source addresses of traffic that is intended for a particular destination or set of destinations. A trend of certain parameters pertaining to this history is can be discovered. The parameters for which a trend is determined in some embodiments include:

(1) a histogram of the frequency of appearance of each source address;

(2) the probability for a given source address to occur at any given time in a day;

(3) the inter-arrival time between flows from a given source address; and/or (4) another parameter or trend recognized by one of ordinary skill.

A subset of the parameter trends is used to categorize addresses as "frequent flyers" in relation to a destination or set of destinations. A frequent flyer is a source address that is determined to be legitimate and thus is trusted. This determination is based on historical observations related to the frequency and time of appearance of traffic from this source address to the destination(s) in question. Other criteria for identifying the frequent flyers are based on: (1) time-of-day considerations pertaining to the traffic coming from the address and intended for the destination or set of destinations; (2) anomalies in transactions; and/or (3) completed transactions, such as, for example, frequency and/or recentness of transactions.

The frequent flier concept has particular advantages. For instance, a characteristic of single-packet inbound attacks is that a single packet is seen from an endpoint that was never seen before. Some embodiments leverage this characteristic by declaring as frequent flyers, those endpoints that complete bi-directional transactions. Since spoofed sources typically cannot complete a bi-directional transaction, the expected response by the real owner of the spoofed address is to drop or ignore the first packet. Thus, a frequent flyer category for trusted data and/or traffic can provide protection against spoofed source attacks. One of ordinary skill will recognize various additional embodiments employing the frequent flyer concept. For instance, a third packet can be identified in a transaction as a good indication of an endpoint that is trusted. Some embodiments can require the third packet to not be a reset (RST) packet.

Some embodiments rely on anomalies in the transactions to determine frequent flyers. These embodiments are often effective against various types of the single-packet (user datagram protocol) UDP Microsoft® variety of attacks, such as "Slammer." Slammer-type attacks typically contain anomalies in the transactions. These embodiments often give a significant proportion of frequent flyer customers better service, such as, for example, a higher priority resource, than the Slammer traffic. Thus, the frequent flyers of these embodiments are unaffected by the Slammer traffic because of the high priority resource. The larger the proportion of frequent flyer customers from uninfected locations, the more these embodiments minimize the Slammer-type attacks. The detection and control implemented by the embodiments illustrated in FIGS. 1-4 include the frequent flyer concept described above. The frequent flyer concept can be implemented for a service provider and/or an enterprise. These embodiments typically involve communication between the service provider and the enterprise. Some examples of various embodiments implemented for an enterprise and/or for a service provider are described in Section III below. However, the discussion proceeds next to the resources of some embodiments. Once traffic has been categorized, it typically must reach its destination through one or more resources.

B. Resource Allocation

Figure 5:
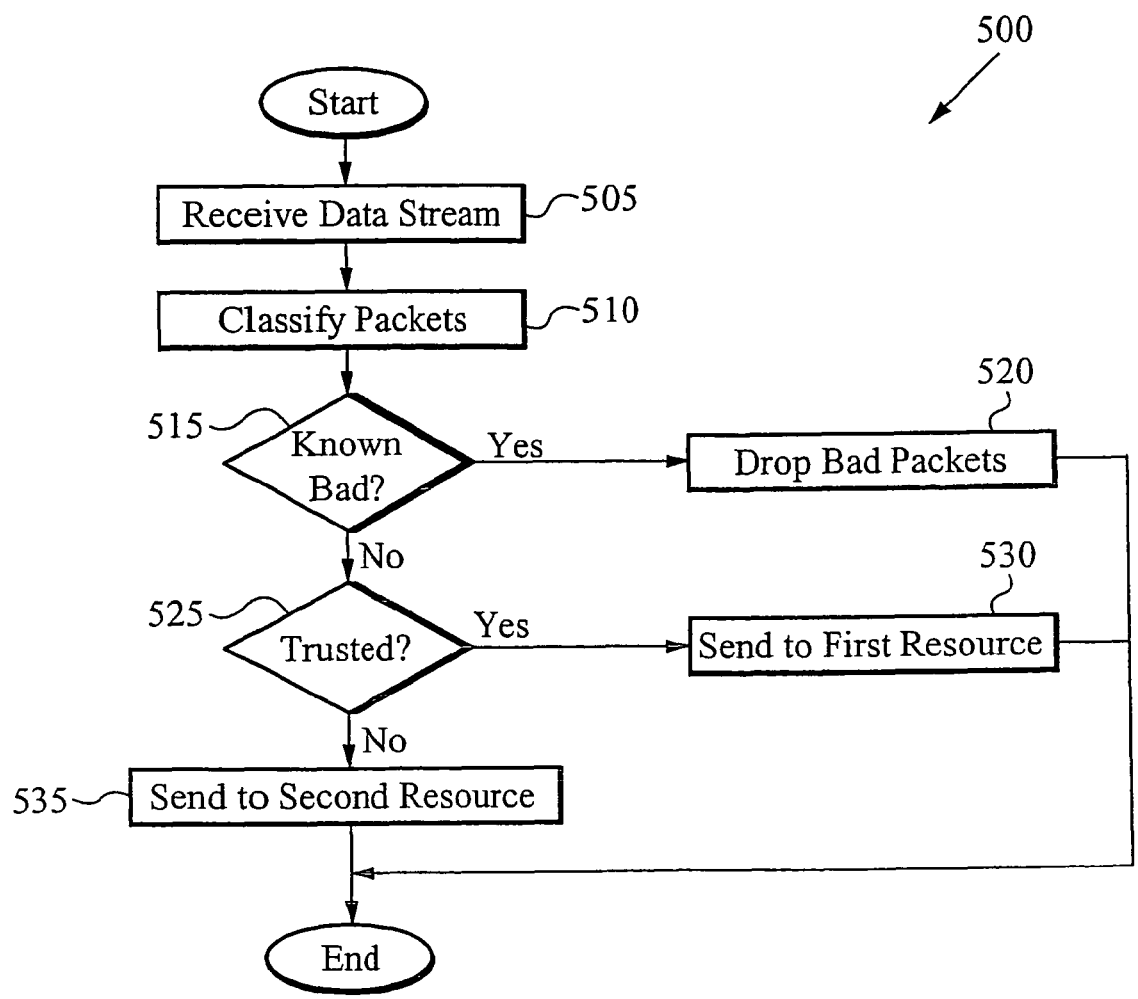
FIG. 5 illustrates a process flow for resource allocation according to the invention.

FIG. 5 illustrates a process flow for the resource allocation of some embodiments. As shown in this figure, the process 500 begins at step 505 where a data stream is received. The data stream of some embodiments comprises data packets. Next, at step 510, the packets are classified, or as described above, the traffic is categorized into subsets. If, at step 515, the traffic includes, for example, packets having data that is known to be bad, then the process 500 transitions to step 520, where the bad data (packets) are dropped, in some embodiments. The process 500, then concludes.

If at step 515, the traffic was not classified as bad (at step 510), then the process 500 transitions to step 525, where a determination is made whether the traffic is suspect. If at step 525, the traffic is determined to be trusted, then the process 500 transitions to step 530, where the traffic is assigned to a first resource that is designated, for example, for trusted traffic. The process 500 then concludes. If at step 525, the traffic is suspect, then the process 500 transitions to step 535, where the traffic is assigned to a second resource designated, for example, for suspect traffic. The process 500 then concludes.

Figure 6:
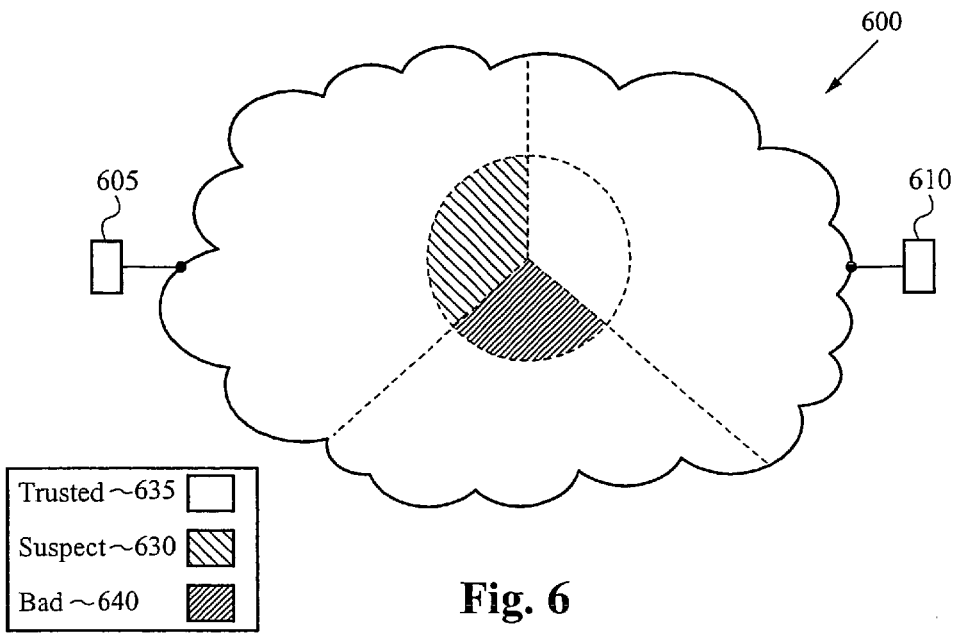
FIG. 6 conceptually illustrates a resource allocation for a network.

FIG. 6 conceptually illustrates that the network 600 of some embodiments is divisible into several resources, for example, by type or quality of resource. As shown in this figure, the allocation for the network resources of some embodiments includes resources for suspect 630, trusted 635, and bad 640 traffic and/or data. Thus, the traffic traveling from a first device 605 to a second device 610 through the network 600 is associated with one or more of these resource types.

Figure 7:
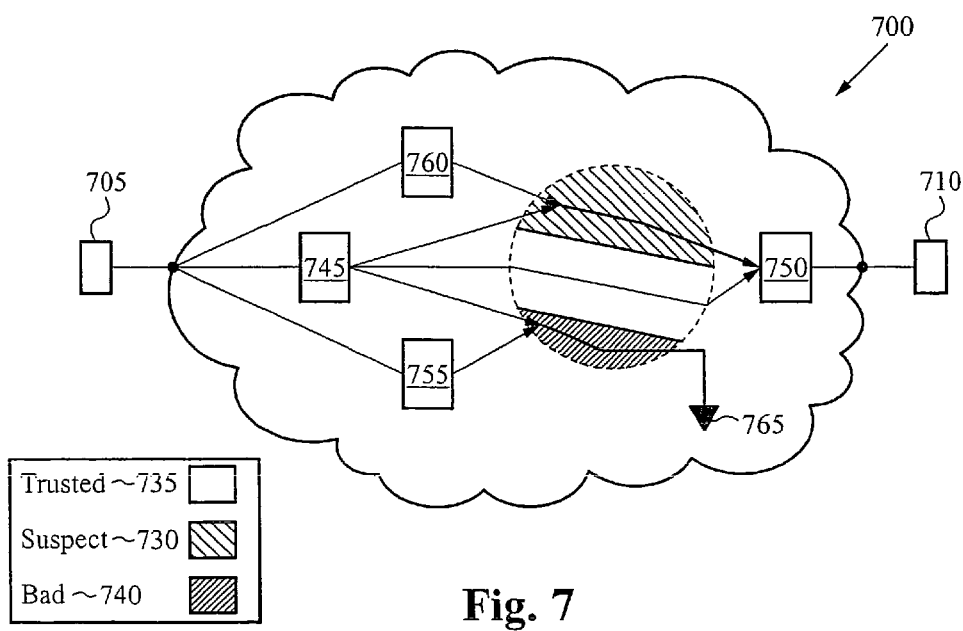
FIG. 7 conceptually illustrates several devices sending traffic by using a network resource allocation.

FIG. 7 illustrates another example of a resource allocation for some embodiments. As shown in this figure, a network 700 includes a resource 730 for suspect traffic, a resource 735 for trusted traffic 735, a resource 740 for traffic that is known to be bad, a source 705, a destination 710, and several network devices 745, 750, 755, and 760. The network devices 745, 750, 755, and 760, of some embodiments represent specific features of the network's topology, such as, for example, a node, or a "hop" on the network, that includes a router, a bridge, and/or another network feature. The network devices 745, 750, 755, and 760, are further discussed below in Section III.

As shown in FIG. 7, the traffic from the source 705 to the destination 710 is determined at various times and/or locations in the network 700 to be either trusted, suspect, or known to be bad. Some embodiments employ the process described above in relation to FIGS. 1A and 1B to categorize the traffic. Then, each category of the traffic is directed to a resource that is assigned to that category of traffic. For instance, the traffic from the network device 745 is directed to the resources for suspect 730, trusted 735, and/or bad 740 traffic, while the traffic from the network device 755 is directed to the resource(s) 740 for the bad traffic. As illustrated in FIG. 7, the resources of some embodiments are such that the bad traffic does not affect the suspect traffic, and the suspect traffic does not affect the trusted traffic. Some embodiments perform the resource allocation differently. These differences are described below.

1. Black Holing

Figure 8:
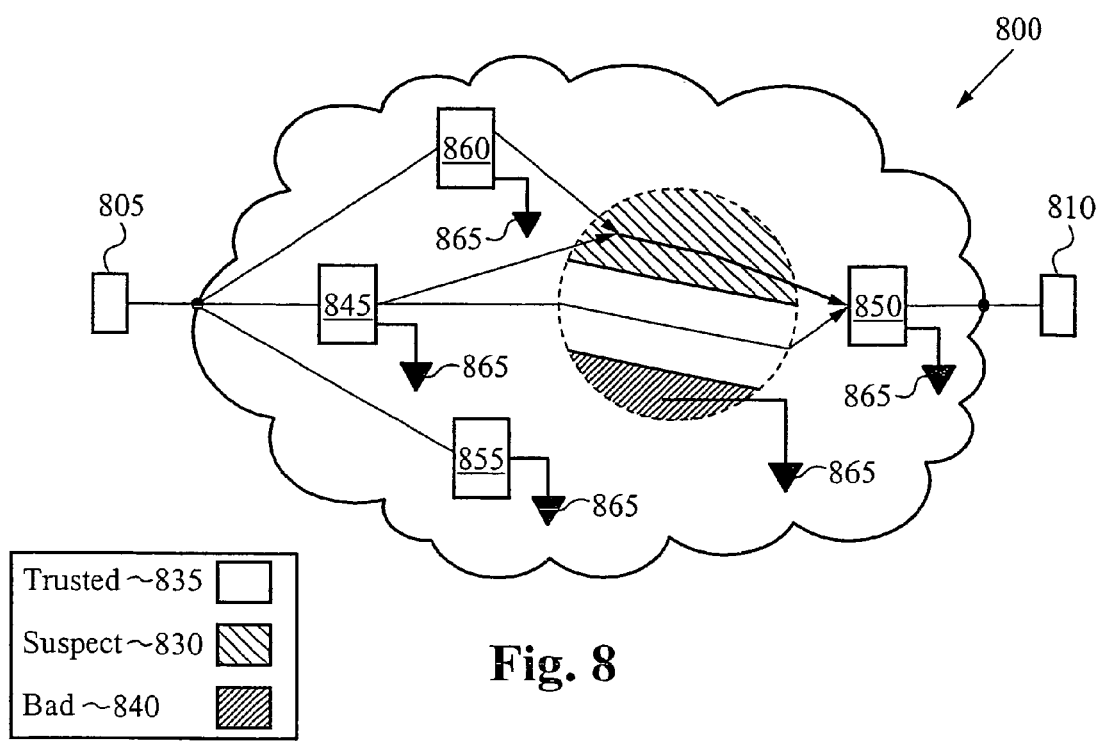
FIG. 8 illustrates that the network devices of some embodiments are intelligent and drop bad traffic locally.

FIG. 8 illustrates that the network devices 845, 850, 855 and 860, of a network 800 can treat traffic categorized as bad, differently. For instance, bad traffic can be dropped. Dropped traffic is black-holed at the edge of the network. FIG. 8 illustrates an example where traffic is dropped and/or black holed. The network devices include the capability to drop and/or black hole data. In these embodiments, the data are often in the form of packets. As shown in FIG. 8, the network devices 845, 850, 855 and 860 of some embodiments include enhanced features, such as a means 865 to recognize and/or drop the bad traffic. Some embodiments perform the dropping and/or black holing without allocating and/or assigning the discarded data to a resource, such as the resource 840 for bad traffic. The system can be designed so that the traffic that is known to be bad is dropped in this manner, and in some embodiments the dropped traffic is black-holed at the edge of the network.

2. Rate-Limiting

Suspect traffic can be rate-limited. Some embodiments achieve rate-limiting by using a token bucket, while some embodiments achieve rate-limiting through another means, such as, for example, weighted fair queuing. In these embodiments, the weight assigned to suspect traffic is lower than the weight assigned to trusted traffic.

Also, a service provider, such as an Internet service provider, has knowledge of one or more parameters pertaining to its peers. For example, the service provider has knowledge of the capacity of its enterprise customers' inbound links. In such instances, the service provider of some embodiments uses this knowledge to throttle traffic so that the capacity of the enterprise's links is not overwhelmed. For example, a particular enterprise customer has a total inbound capacity for handling the traffic directed toward and/or through its subnetwork. If the sum of the trusted and suspect traffic directed through the enterprise's subnetwork adds up to more than the total inbound capacity for the particular enterprise's subnetwork, the service provider may either rate-limit or drop a portion of the suspect traffic. In these cases, the service provider maintains the quality of service provided to the enterprise regarding the trusted traffic, to the detriment of the suspect traffic. Rate-limiting and/or dropping traffic are achieved by using various methods. Rate-limiting is implemented in some embodiments by, for example, using token buckets, using ToS markings, and/or by using (multiprotocol label switch) MPLS tags. Some embodiments drop the packets by using buffer management schemes and/or black holing, as mentioned above. One of ordinary skill will recognize that additional means can be used to control traffic by rate-limiting and/or dropping, for example, the packets that comprise the traffic.

3. Tagging and Routing

The resources for the different traffic categories can comprise different ToS markings. For example, trusted traffic is assigned a ToS marking that will guarantee the trusted traffic to have priority over traffic from the other categories. Likewise, the different traffic categories are routed differently. These embodiments are described further in the examples below. In some embodiments, the different traffic categories are tagged differently, such that they use logically different paths.

4. Logical Versus Physical Resources

The different resources of some embodiments include different logical resources. Different logical resources can actually share the same physical resource. Different logical and/or physical resources preferably correspond to different priority levels. For instance, priority queuing (PQ) provides the different priority levels of some embodiments, while some embodiments use class-based weighted fair queuing (CB-WFQ) to provide the different priority levels.

C. Examples of Categorization with Resource Allocation.

1. Source-Based

Different embodiments use different criteria for the detection of attacks and the control of traffic and routing. As described above, different embodiments use different categories, resources, and allocations to effect control. Some embodiments use the source, while some embodiments use the destination, of the traffic for the detection and control. The attributes of the packets are used in some embodiments. Some embodiments track the source of the traffic that is intended for a particular destination address. Based on the source and/or destination address, these embodiments determine whether the traffic is trusted or suspect. The source address is used to send the traffic to the appropriate resource. For example, traffic that is determined to be suspect because of its source is diverted to the resources reserved for suspect traffic. More specifically, some embodiments direct traffic, such as suspect traffic, to the various resources by, for example:

(1) assigning the traffic a specified range of ToS markings;
(2) assigning the traffic to a set of different physical paths; or
(3) marking the traffic with a particular MPLS tag such that the traffic is directed along a particular set of MPLS tagged routes, or to a particular set of MPLS-capable routers.

2. Destination-Based

Moreover, some embodiments track traffic having a particular destination address, or set of destinations. Based on this destination address, these embodiments determine whether the traffic is trusted or suspect. In some embodiments, the destination address is used to send the traffic to the appropriate resource. For example, traffic that is determined to be suspect based on the destination is diverted in some embodiments to the resource(s) reserved for suspect traffic. As described above, some embodiments treat suspect traffic differently by using, for example, ToS markings, particular physical paths, and/or MPLS tags over tagged routes.

3. Frequent-Flyer-Based

Some embodiments identify, categorize and/or control traffic based on the frequent-flyer model described above. Also mentioned above, frequent-flyer traffic is typically assigned to the best available resources to provide the highest quality of service to this category of traffic.

4. Flow-Based

The features of source-based and/or destination-based categorization and/or resource allocation in the context of other identification, categorization, and/or control methods can be applied. For example, detection, control, and frequent flyer membership determinations are based on a combination of source and destination information. These determinations are based on per-flow information. Other ways to identify and/or categorize traffic are evident to those of ordinary skill. For instance, some embodiments are constructed based on the destination or set of destinations that include enterprises, service providers, and/or a combination of these with another destination.

D. Other Contexts

The foregoing can be expanded to other contexts. These contexts include the spoofed-source single-packet attacks mentioned above and additional contexts, such as, for example, zombie farms perpetrating real transactions. In these cases, successful transactions are tracked over time per one or more endpoints. Those endpoints that include long time customers are trusted. These embodiments categorize as either suspect or bad any new endpoint and, similarly, some embodiments categorize, by default, unknown and/or new traffic as suspect rather than bad.

E. User and Traffic History

While the traditional intrusion detection systems (IDS) in the art typically determine that traffic is bad, these intrusion detection systems do not typically determine that suspect traffic is indeed trusted. Section II below describes some common features of the traditional intrusion detection system. In contrast to the typical intrusion detection system, some embodiments keep a history of resource usage, application performance, and other patterns for various users of a network. The history is typically kept in a database. The history is typically used to determine whether suspect traffic should be trusted. The categorization of a first subset of traffic and/or the determination of an action for a second subset of traffic can be performed by utilizing a set of application-management tools and directories. For instance, the application-management tools and directories are used to determine whether the suspect traffic should be trusted. In certain instances, these application-management tools and directories are provided by Avaya, Inc.

To distinguish trusted traffic from other traffic, information from directories and other network management and application management tools is used. These tools include, for example, lightweight directory access protocol (LDAP), session initiation protocol (SIP), and/or Netflows® computer network performance system. Netflows® is a trademark Janus Research Group, Inc. of Appling, Ga. Knowledge of the users' characteristics and requirements contributes in the determination of whether traffic is indeed trusted. For example, some embodiments know that a given user is currently in a particular geographic area, is expected to run a particular application, and is using a cellular device. Some embodiments obtain this information by using a SIP directory, while some embodiments discover the information through integration with a call server. The traffic is observed from this user to determine whether it matches the expected pattern for a trusted endpoint. A suite of protocols can be used to aid in the determination of a category for the first subset of traffic and/or to determine an action for the second subset of traffic.

Some embodiments interact with other network elements, such as, for example, a router, by using various protocols, such as, for example, border gateway protocol (BGP) and simple network management protocol (SNMP). These embodiments leverage the protocols in both the detection and control phases. For example, some embodiments employ prefix information. These embodiments consider as suspect, traffic that originates (sources) from addresses having a known address prefix. These embodiments then determine whether the suspect traffic from the prefix is, in fact, known to be bad. Also, when attempting to control traffic that is either suspect or known to be bad, some embodiments leverage a set of BGP controls to send appropriate route changes for the appropriate prefixes. Moreover, SNMP plays a synergistic role in the detection and control of some embodiments. For instance, in some embodiments, detection and/or control is based on changes in load readings, as obtained from SNMP, for example.

II. CRITICAL BOUNDARY IMPLEMENTATION

Providing monitor, assess, and control technologies enhances the quality of security solutions by adding an additional constraint to the network environment. An additional boundary is implemented in conjunction with the traditional intrusion detection system (IDS) boundary. These embodiments provide an additional level of granularity in dealing with network traffic and attacks. The enhanced subtlety in reacting to attacks leverages the system's unique ability to control the traffic by choosing, with a high level of granularity, the resources for one or more types of traffic. Traffic that is determined to be suspect is still forwarded without harm, by ensuring that the resources used for suspect traffic are different from those used by trusted traffic. Only traffic that is determined to be bad with a high level of certainty is dropped. Through monitoring of application performance, the trusted traffic receives the best level of service. These embodiments also control the service level that suspect traffic receives. For instance, the most-highly-suspect traffic receives the most-degraded or lowest quality of service, particularly when resources become constrained, such as during an attack.

Figure 9A:
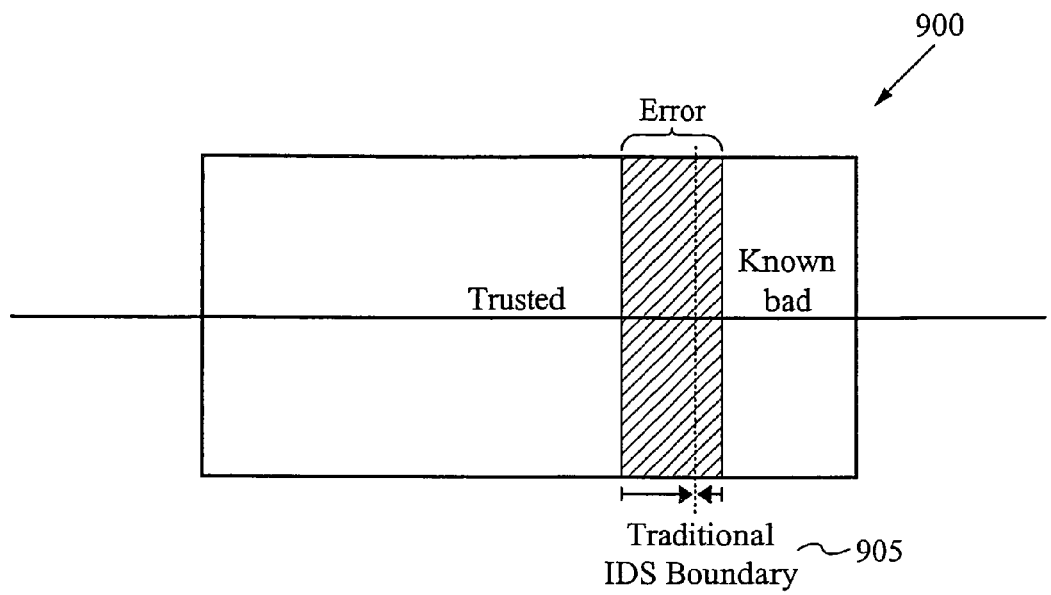
FIGS. 9A and 9B conceptually illustrate the critical boundary in a typical intrusion detection system.
Figure 9B:
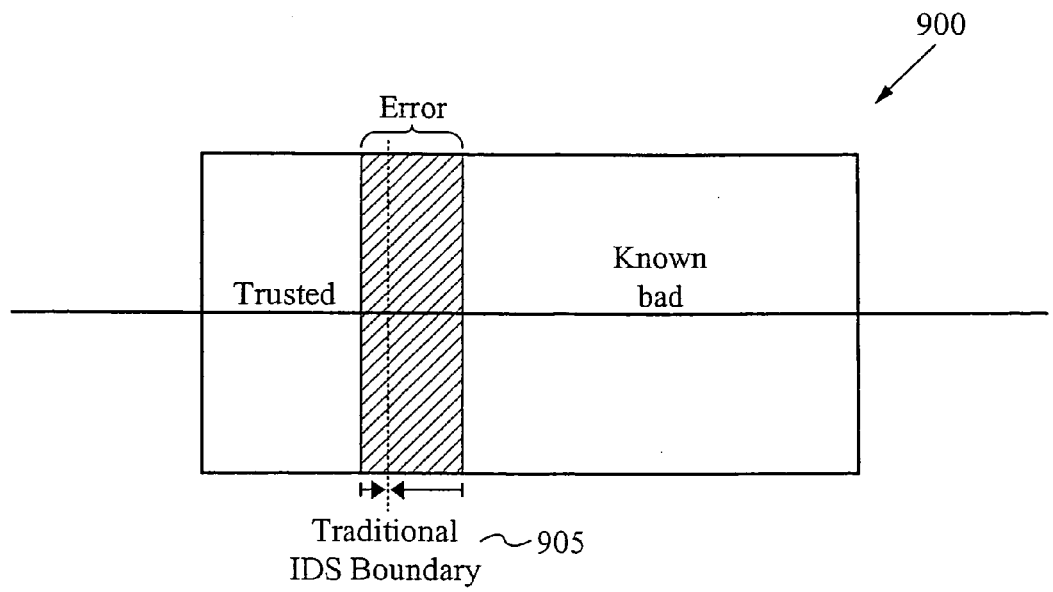

FIGS. 9A and 9B conceptually illustrate the critical detection boundary of the typical intrusion detection implementations known in the art. As shown in these figures, the critical boundary 905 of the implementations known in the art lies between traffic that is known to be bad, which is denied, and all other traffic, which is allowed through. A drawback of these approaches known in the art is that the success of these implementations depends heavily on the accurate detection of attacks that use bad traffic as a weapon. However, as described above, the typical implementations are often unsuccessful at detecting the myriad of attacks at the traditional boundary. Thus, these approaches can yield a high margin of error, illustrated by hatched lines, in the form of false positives and false negatives.

Figure 10:
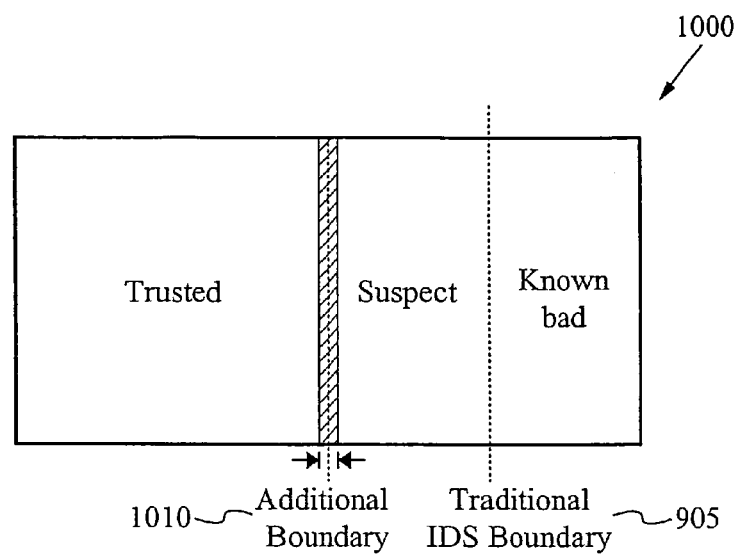
FIG. 10 conceptually illustrates the critical boundary as implemented in certain embodiments.

In contrast, FIG. 10 illustrates the boundaries implemented by preferred embodiments of the present invention. As shown in this figure, the critical boundary 1010 of some embodiments is between traffic that is determined to be trusted, and all other traffic, such as, for example, suspect and known to be bad traffic. Thus, the success of these embodiments in detecting and/or preventing attacks becomes less dependent on the high accuracy at pinpointing the traditional boundary 905 between traffic that is known to be bad and all other traffic.

This can leverage the fact that suspect traffic flows are able to still gain access. This treatment of suspect traffic tends to move the boundary more "centrally." This feature allows a more accurate balance between false positives and false negatives. This can also provide the advantage of imposing the relatively mild action of demoting or downgrading from trusted status to suspect status previously-trusted traffic that becomes suspicious. Thus, the downgrade is milder than the action taken at the traditional permit/deny boundary 905 that is known in the art.

III. SYSTEM IMPLEMENTATION

A. System and Router

By using application programming interfaces (APIs), network management tools, applications, and through monitoring of network resources and application performance to end users, a unique view is provided that combines application knowledge, historical knowledge of the users, their traffic patterns and the applications they use, and the expected characteristics and requirements of the users and their applications. This more-intelligent view affords the embodiments of the present invention more knowledge in detecting and responding to attacks. Some embodiments further allow more precise and/or subtle reactions to attacks. The intelligence in detecting attacks is significantly enhanced by identifying at least three categories for traffic, instead of the two categories of the standard intrusion-detection approach. Some embodiments examine the applications and extend the knowledge of applications to traditional systems and further enhance existing intrusion-detection systems in other ways. Some embodiments further address the issues that traditional systems face, such as, for example, down time.

Various embodiments are implemented in software and/or hardware. The hardware implementations include a device, a network, and/or a combination of software, hardware, and one or more device(s). Some embodiments implement network control and administration functions in a network device, such as, for example, a router that is implemented in software and/or hardware. The network devices of some embodiments include enhanced features over typical devices known in the art. These enhanced devices include, for example, a routing intelligence unit (RIU) provided by Avaya, Inc.

Some embodiments effect control by injecting route changes to one or more of the routers and/or routing intelligence units in a network architecture. These embodiments assign traffic to a resource that is suited to a given category of traffic. For instance, some embodiments assign ToS markings to identify the categories of traffic. The traffic that these embodiments identify as more important, such as, for example, trusted and/or frequent-flyer traffic, receives prioritized treatment.

B. ISP and Enterprise System

Figure 11:
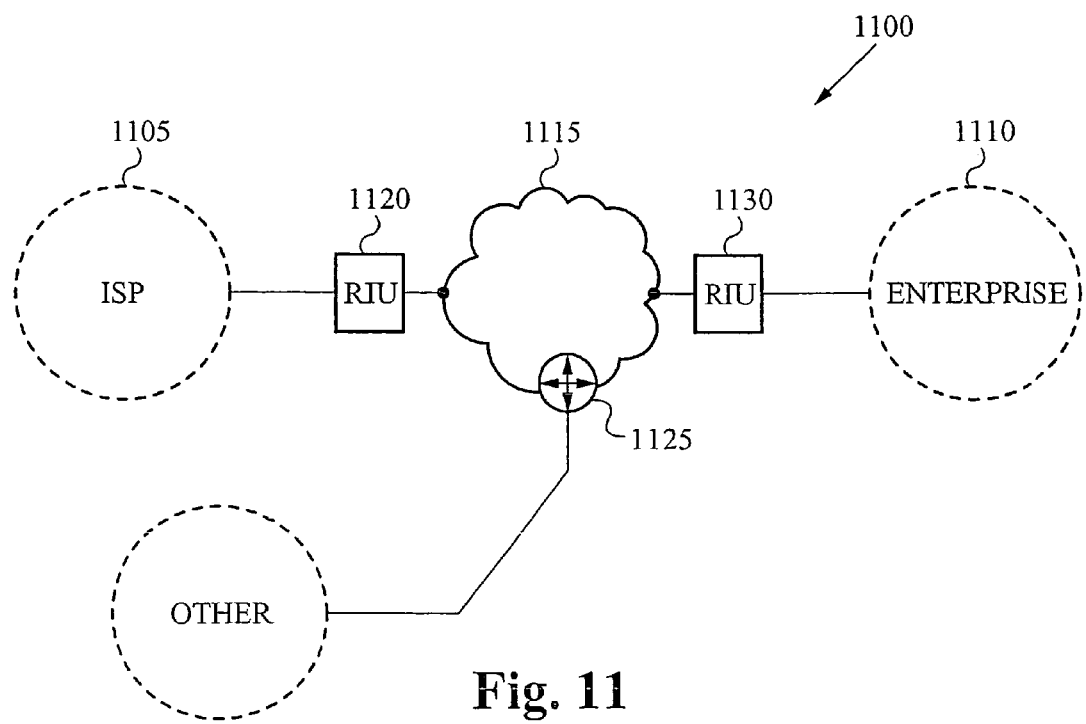
FIG. 11 illustrates the system architecture of the invention.

The various features of the embodiments described above are combined differently in different embodiments. These embodiments include implementation in enterprise and/or Internet service provider (ISP) settings. For instance, FIG. 11 illustrates the system 1100 of some embodiments. As shown in this figure, the system 1100 includes an ISP subnet 1105 coupled to an enterprise subnet 1110 through a network 1115. The network 1115 is typically a wide-area network or a network-of-networks, such as the Internet. Also shown in FIG. 11, multiple instances of network routing devices 1120, 1125 and 1130 are installed at one or more locations on the network 1115. The devices in the system 1100 of FIG. 11 include a heterogenous collection of networked devices, such as, for instance, the routing intelligence units 1120 and 1130, and a standard router 1125.

C. Location of Implementation

The invention can be implemented within the network of an enterprise and/or an Internet service provider. When implemented within an enterprise, some embodiments are implemented within the enterprise's central headquarters, the headquarters' edges, within a branch, and/or at the branch edges. Similarly, when implemented within a service provider location, some embodiments are implemented at the core and/or at the edge of the service provider's network. In particular, some embodiments are implemented as close as possible to the edge of the enterprise and/or service provider's network. Various implementation locations provide for certain features, such as notification and feedback. These implementations are described in relation to the figures referenced below.

1. AT THE EDGE AND INSIDE THE ENTERPRISE SUBNETWORK

Figure 12:
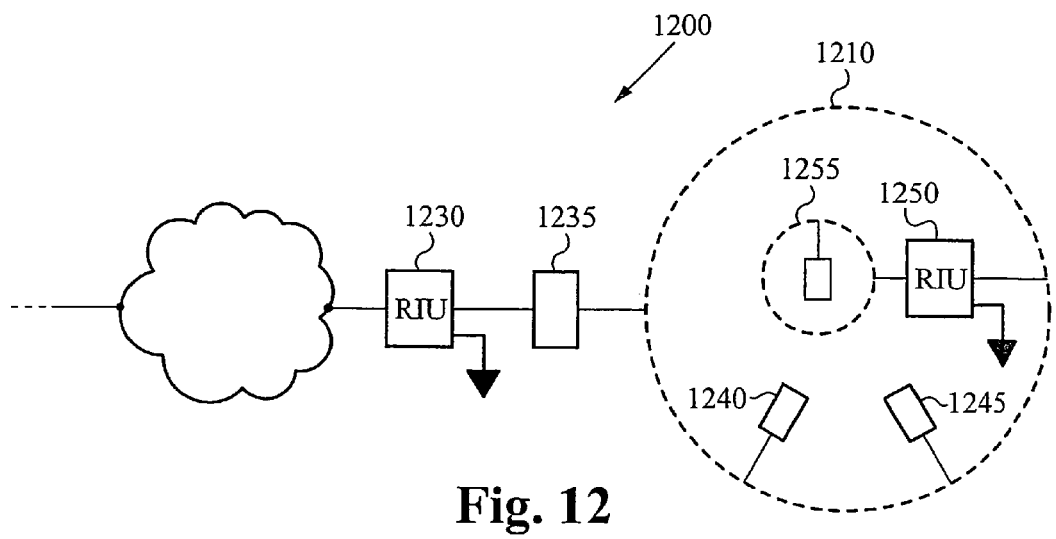
FIG. 12 illustrates the enterprise architecture in further detail.

For instance, the invention can be deployed at the edge of the enterprise network. These embodiments particularly serve to scan incoming traffic to the particular site. FIG. 12 illustrates a network 1200 containing a network device 1230 located at the edge of an enterprise subnetwork 1210. As shown in this figure, the subnet 1210 operates in conjunction with the networked devices 1230 and 1235. The subnet 1210 also includes several networked devices 1240, 1245 and 1250, that form the subnet 1210, including a nested sub-subnet 1255. The network device 1230 is a routing intelligence unit. The representative embodiment, illustrated in FIG. 12, typically uses the methods discussed above in Section I to categorize traffic that is entering the enterprise's subnet 1210. Thus, these embodiments typically categorize the incoming traffic as trusted, suspect, or known to be bad. Traffic that is known to be bad is dropped or black holed, while trusted and suspect traffic are directed to resources that are assigned to each of these traffic categories. As mentioned above, such resources include, for example: ToS markings, MPLS tagged routes, different physical links, different routes, and/or one or more rate controller(s). In some embodiments, rate control is achieved by using token buckets. For example, in some embodiments, suspect traffic is rate limited in the site's infrastructure by using the token buckets. Also shown in FIG. 12, an additional routing intelligence unit 1250 is located well inside the infrastructure of the enterprise subnetwork 1210. One of ordinary skill will recognize that some embodiments have several nested layers of sub-subnets within the subnetwork 1210, and that additional network devices and/or routing units are optionally installed within very deep layers of these nested sub-subnetworks.

The networked devices 1235-45 can be different servers. In such embodiments, the trusted and suspect traffic streams entering the enterprise subnetwork 1210 are directed toward the different servers 1235-45. For instance, the suspect traffic of some embodiments is specifically directed toward the networked server device 1240, while the trusted traffic is directed toward a trusted server 1245. These embodiments reduce the likelihood of having trusted servers affected by the content in the suspect traffic.

The nested device and/or subnetwork architecture illustrated in FIG. 12 has further advantages. For instance, the multiple installations of the routing intelligence units 1230 and 1250 permit traffic that is destined for the site and for various locations within the site, to be checked at multiple stages with varying levels of granularity. Moreover, in these embodiments, the traffic that is known to be bad is dropped at the routing intelligence unit 1230 and also at the routing intelligence unit 1250. Further, previously-categorized traffic is up-down-graded at these various locations. Additionally, the routing intelligence unit 1250 illustrated in FIG. 12 is installed deeper in the site's infrastructure, and closer to certain server locations. Placement at this location has particular advantages, such as allowing for more specialized detection and/or control for the nearby servers.

In addition, the system architecture can enhance scalability because the amount of traffic that reaches the different servers deep into the site's subnetwork is less voluminous than the aggregate traffic that crosses at the site's edge. Moreover, the invention performs the functions described in the previous example, such as directing different categories of traffic toward different servers.

2. AT THE EDGE AND INSIDE THE SERVICE PROVIDER SUBNETWORK

Figure 13:
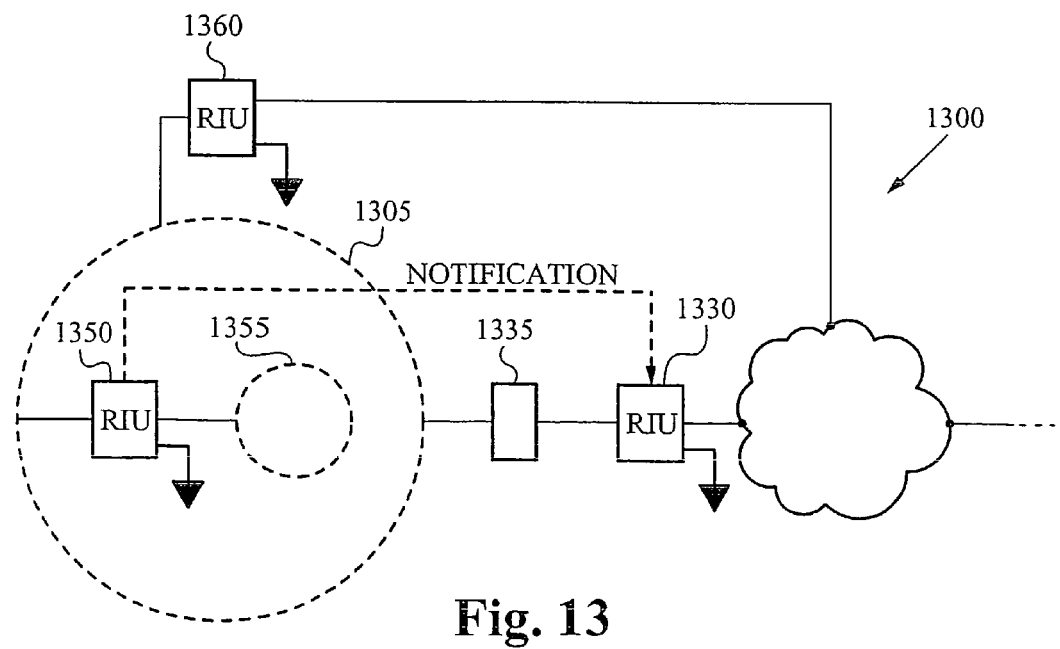
FIG. 13 illustrates the service provider architecture in further detail.

FIG. 13 illustrates a network 1300 where the network devices of some embodiments are also installed at multiple locations of the service-provider subnet 1305, for example, at the network devices 1330, 1350, and 1360. The exemplary site illustrated in this figure (in this case, an exemplary service-provider site 1305), includes more than one entry point into the site. Specifically, these entry points are guarded by the network devices 1330 and 1360, respectively. These exterior installations 1330 and 1360 typically examine and/or categorized traffic at the entry points by using one or more of the methods described above in Section I. As mentioned, the traffic that is known to be bad can be dropped before it enters the site 1305.

Also shown in FIG. 13, the service-provider subnet 1305 also includes a sub-subnet 1355 and a network device 1350 installed within the site. Thus, similar to the enterprise model illustrated in FIG. 12, the service-provider subnet 1305 of some embodiments includes exterior installations 1330 and 1360 and an interior installation 1350. In these embodiments, the different locations of installation provides multiple lines and/or levels of defense from attack. Specifically, the interior installation 1350 provides more-granular detection and control for the service provider site 1305.

Moreover, the multiple installations can provide additional features within the site. These additional features, include feedback and/or upstream notification. For instance, as illustrated in FIG. 13, the interior installation 1350 shares its more-detailed information with the exterior installation 1330 at the network edge by using upstream notification. The upstream notification of these embodiments typically includes control/signalling-type information regarding, for example, (1) traffic that is determined to be trusted, including frequent-flyer information, (2) traffic that is determined to be suspect, and/or (3) traffic that is determined to be bad. The upstream notification of some embodiments requests the exterior installation 1330 at the site's edge to act differently for the different traffic categories. Some embodiments enforce the different actions for different traffic categories described above. Similarly, the exterior location 1330 feeds information forward regarding traffic destined for a location within the service provider subnetwork 1305.

3. MORE NOTIFICATION EXAMPLES

Figure 14:
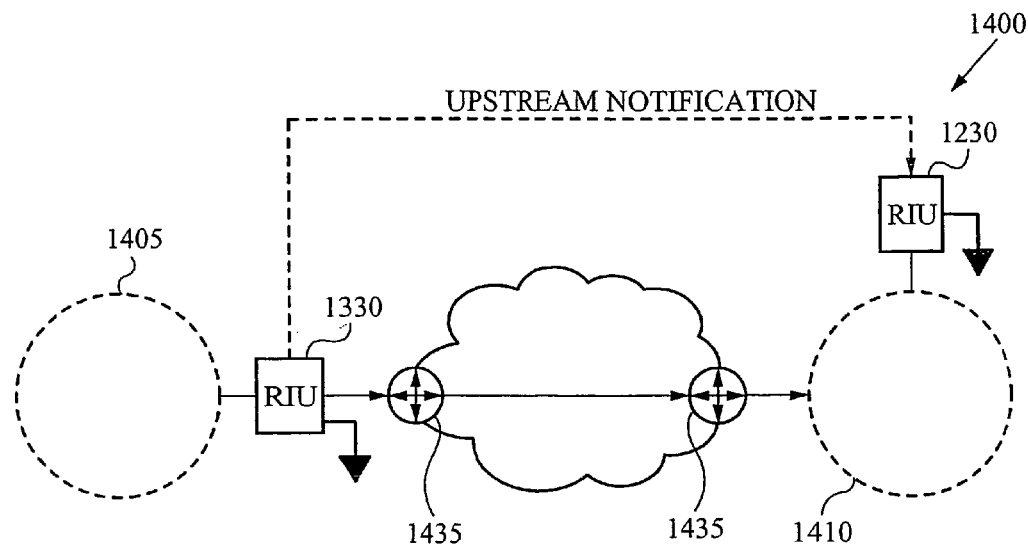
FIG. 14 illustrates upstream notification according to the invention.

The intra-site notification described above can be adapted for inter-site locations. In such systems, network devices such as routing intelligence units in both the service provider and enterprise subnetworks independently perform one or more of the functions described above. The service provider notifies the enterprise of the presence of suspect traffic directed to the enterprise's network. In these embodiments, the service provider notifies the enterprise of a variety of aspects pertaining to the traffic categorization and control. The service provider of some embodiments offers the notification as a service to the enterprise customers. For instance, FIG. 14 illustrates a network 1400 that has a service provider 1405 notifying an enterprise 1410 with additional control-type information, such as, for example, information that the traffic directed to the enterprise 1410 contains suspect traffic. The mixture of heterogenous network devices illustrated in FIG. 14 include "intelligent" devices such as the routing intelligence units 1230 and 1330, as well as standard network devices such as a typical router 1435. Some embodiments send and receive control-signal information such as notifications by using the intelligent devices.

Figure 15:
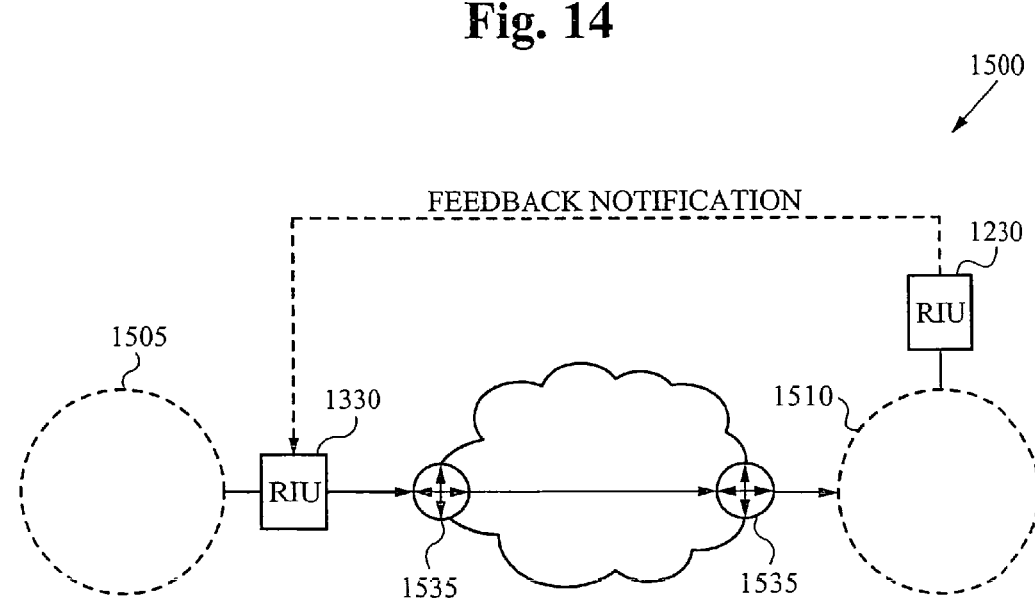
FIG. 15 illustrates feedback notification according to the invention.

FIG. 15 illustrates that, the network device 1230 at the enterprise subnet 1510 sends feedback notifications to the network devices 1330 located at the upstream service provider 1505. These notifications also typically include control-type information, such as, for example, information regarding the categorization of the received traffic. The enterprise is often better positioned to have more knowledge, for example, by using more-advanced detection schemes on the traffic flow. The enterprise of some embodiments further provides better upstream notifications to the service provider. For example, traffic is often encrypted as it leaves the enterprise's premises. Thus, the network devices, particularly at the service provider's edge, cannot use the content of the traffic (packets) in the classification/categorization determinations. These determinations were discussed above in relation to FIGS. 1-6.

The notifications of some embodiments further include identification of specific sources that are to be marked as being suspect, a list of frequent-flyers as determined by the enterprise, additional information regarding the location's routing intelligence unit(s), and/or information regarding rate limits for suspect traffic, or a subset of suspect traffic, for example. In some embodiments, the rate-limiting protects the enterprise's inbound links from being overwhelmed.

D. Providing an Always-On Architecture

1. Passive Control

The network routing control of some embodiments is "passive." Passive control indicates that the control and protective properties are always on. These embodiments do not require triggering based on the detection of an attack. Some of these embodiments further handle attacks consisting of completely-legitimate traffic. Thus, some embodiments detect attacks that are "smarter." For example, some embodiments detect unusual load patterns from legitimate sources. In some instances, these embodiments detect load parameters and/or patterns that are undetectable by typical intrusion-detection systems. Regardless of source or type, if an attack starts, then some embodiments do not need to determine that an attack is under way. Rather, in some embodiments, the trusted users have a smooth experience, and the attack is automatically self-limited.

2. Always On

Some embodiments do not depend on an ability to determine whether an attack is actually occurring. The determinations of the processes described above in relation to FIGS. 1-6, are set up to operate the same under normal and attack conditions. Such systems detect suspect traffic and handle it in a manner that does not necessarily involve the traditional approaches to handling suspect traffic. As mentioned above, typical approaches in the art treat suspect traffic as either known to be bad or trusted. Moreover, traffic that is known to be bad is typically dropped and trusted traffic is typically sent to a resource designated for trusted traffic. Accordingly, the typical approaches yield an undesirably large number of false positives and false negatives. In contrast, some embodiments instead implement an "always-on" architecture by treating traffic as being suspect before it is proved to be trusted. In this manner, such systems minimize an attack's impact, even if the attack is not readily identified before the traffic carries the attack data to a target destination. These embodiments are implemented in various different ways. For instance:

(1) normal traffic receives beneficial handling under normal conditions;

(2) normal traffic does not receive beneficial handling under normal conditions; or (3) normal traffic receives beneficial status according to the business policies in place, or according to another rationale. Some of these embodiments are described next.

Trusted and suspect traffic initially use the same resource, then trusted traffic is re-routed during certain periods of network operation. In certain implementations of the always-on architecture, all flows are directed by default into a "bottleneck" resource. The bottleneck is initially set wide enough to accommodate normal traffic. Alternatively, there is no detectable impact on suspect traffic until an attack starts. During normal network operation, some endpoints become "trusted." As these endpoints become trusted, such systems direct the trusted endpoints to avoid the bottleneck. Alternatively, the trusted traffic can be directed around the bottleneck, through another resource, during various other times, such as, for example, during periods of unusual network activity.

Trusted and suspect traffic is assigned to different resources regardless of the time and/or the network's operation. The traffic entering the bottleneck resource includes bad and/or suspect traffic, such as, for example, the (suspect) traffic from users who are not sufficiently trusted. Such systems have particular advantages over traditional intrusion-detection systems, which likely have not yet even recognized the bad traffic flowing through the bottleneck. Thus, traditional IDS systems will likely not have started blocking (dropping) the bad traffic, until it is too late.

IV. ADVANTAGES

A service provider supplies one or more of the foregoing embodiments as a service to enterprise customers. The service yields certain benefits to these customers. For instance, by allowing suspect traffic to still receive service, some embodiments reduce the chance that trusted traffic is mistakenly dropped. Occurrences of lost business or missed opportunities are therefore minimized. Thus, these embodiments particularly reduce the number of false positives. Further, by ensuring that trusted traffic uses resources that are separate from suspect traffic, special protection is provided for the trusted traffic. For instance, the suspect traffic in these embodiments does not impact the trusted traffic. This is particularly advantageous if it is determined that some of the suspect traffic that was allowed through is in fact bad.

Moreover, given that attacks typically cause load-related performance problems such as congestion either within an enterprise or within a service provider network, some embodiments minimize and/or avoid the attack-related performance problems by directing traffic away from the portions of the networks where the problems occur. Load, performance, congestion, and other problems for networks under attack are described, for instance, in the U.S. patent application Ser. No. 10/070,515, filed Jul. 25, 2002, having publication number 2003/0039212, and entitled "Method and apparatus for the assessment and optimization of network traffic"; U.S. patent application Ser. No. 09/923,924, Aug. 6, 2001, having publication number 2002/0078223, and entitled "Method and apparatus for performance and cost optimization in an inter network"; U.S. patent application Ser. No. 09/960,623, filed Sep. 20, 2001, having publication number 2002/0075813, and entitled "Method and apparatus for coordinating routing parameters via a back-channel communication medium"; U.S. patent application Ser. No. 10/070,338, filed Dec. 12, 2002, having publication number 2003/0161321, and entitled "Method and apparatus for characterizing the quality of a network path"; and PCT International Application PCT/US03/03297, filed 4 Feb. 2003, having international publication number WO/03/067731, and entitled, "Load optimization." These applications are incorporated herein by reference.

In addition, some of the embodiments described above provide an alternative and/or a scalable improvement to existing architectures. For instance, such systems are implemented instead of, or in conjunction with, one or more methods and/or systems that relate to outbound performance optimization, outbound application performance optimization, outbound load optimization, inbound performance optimization, inbound application performance optimization, and/or inbound load optimization. These contexts are described, for instance, in the United States patent applications incorporated by reference above.

While the invention has been described with reference to numerous specific details, one of ordinary skill in the art will recognize that the invention can be embodied in other specific forms without departing from the spirit of the invention. Thus, one of ordinary skill in the art will understand that the invention is not to be limited by the foregoing illustrative details, but rather is to be defined by the appended claims.

What is claimed is:

1. A method of routing data comprising:
   a. receiving a data stream from a node, the data stream comprising a plurality of data packets;
   b. classifying the plurality of data packets, wherein the classifications include:
      i. trusted traffic, wherein trusted traffic includes data from a trusted source;
      ii. bad traffic, wherein bad traffic includes data that is known to contain undesirable data; and
      iii. suspect traffic, wherein suspect traffic includes data that is unknown or that is not from a trusted source; and
   c. routing each of the plurality of data packets to a common destination via a path selected based upon the classification of the data packet, wherein trusted traffic is routed to the common destination via a first path, wherein the bad traffic is routed to the common destination via a second path, wherein the suspect traffic is routed to the common destination via a third path, and wherein the first and third paths are different.

2. The method of claim 1, wherein the first path comprises a first resource and wherein the trusted traffic is routed via the first path by using the first resource, wherein the second path comprises a second resource and wherein the bad traffic is routed via the second path by using the second resource, and wherein the third path comprises a third resource and wherein the suspect traffic is routed via the third path by using the third resource.

3. The method of claim 2, wherein a plurality of the first, second, and third resources are the same logical resource.

4. The method of claim 2, wherein a plurality of the first, second, and third resources are the same physical resource.

5. The method of claim 2, wherein the first, second, and third resources are different resources.

6. The method of claim 1, wherein the second path is different from the first and third paths.

7. The method of claim 1, wherein the second path is the same as one of the first and third paths.

8. The method of claim 1, further comprising providing an always on architecture, such that a packet is classified as suspect before the packet is proven to be trusted.

9. The method of claim 1, further comprising steering traffic away from an attack related performance problem.

10. The method of claim 9, wherein the performance problem includes one of application performance degradation, a brownout, and a blackout.

* * * * *